Figure 4:
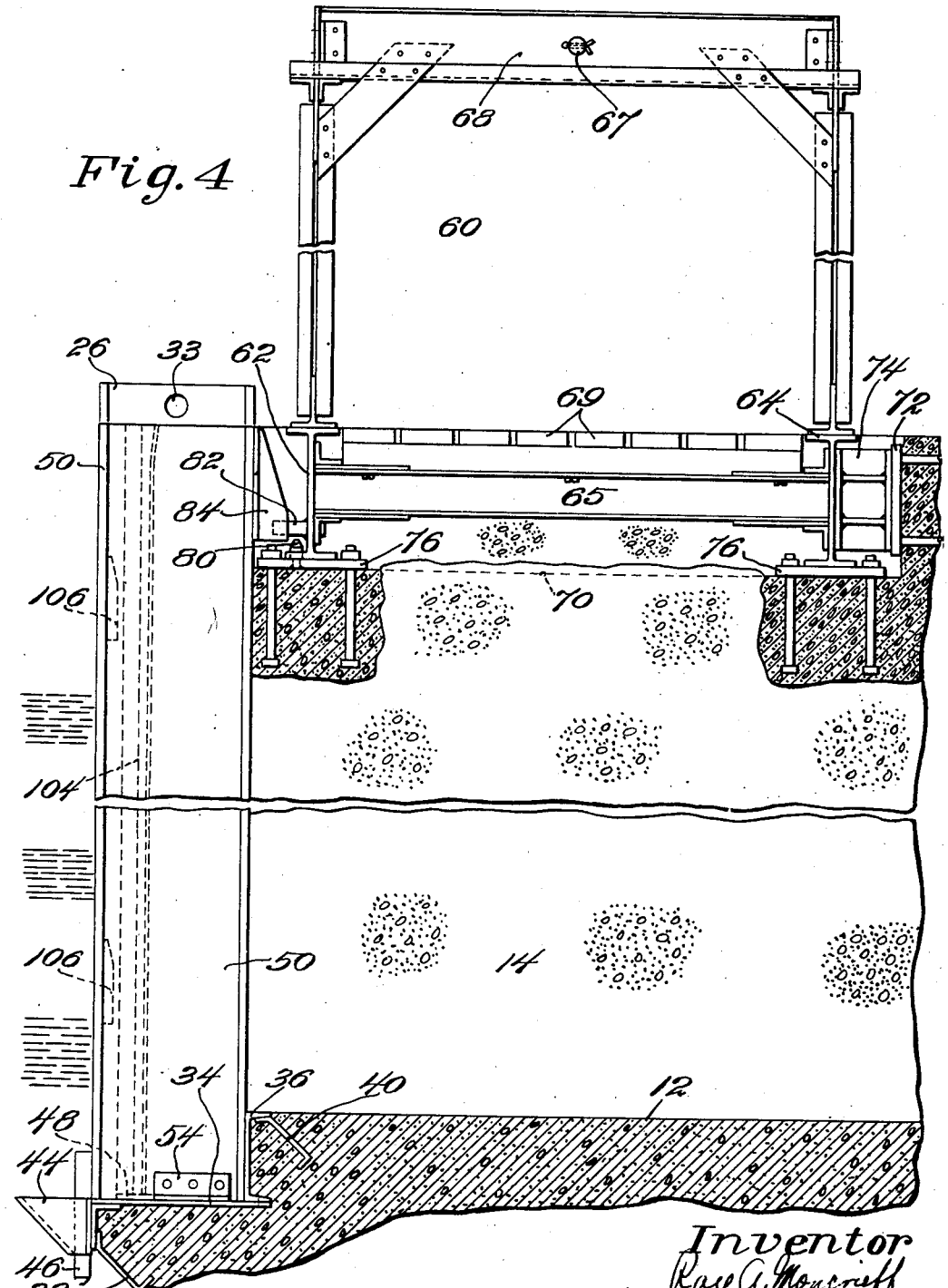

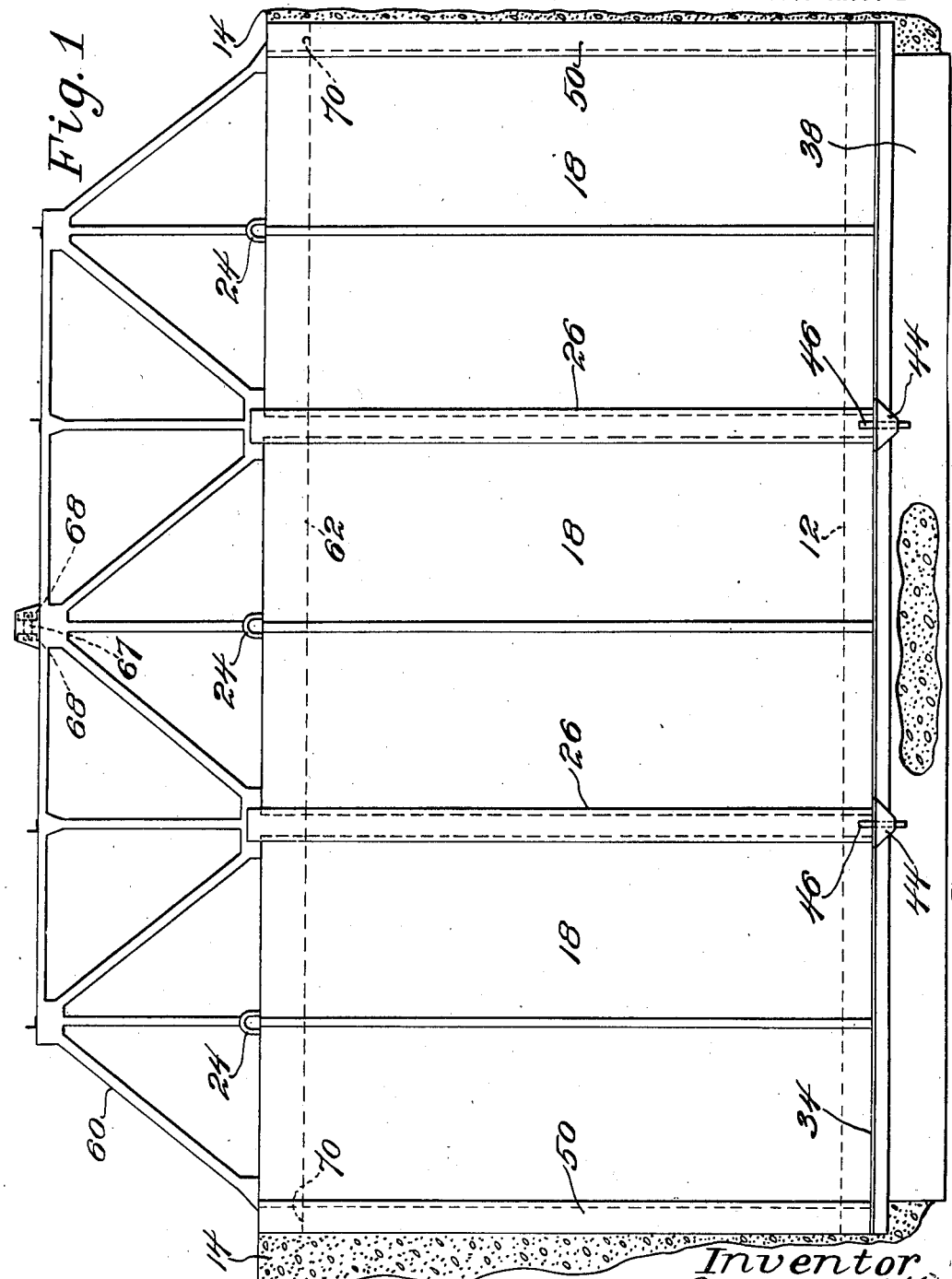

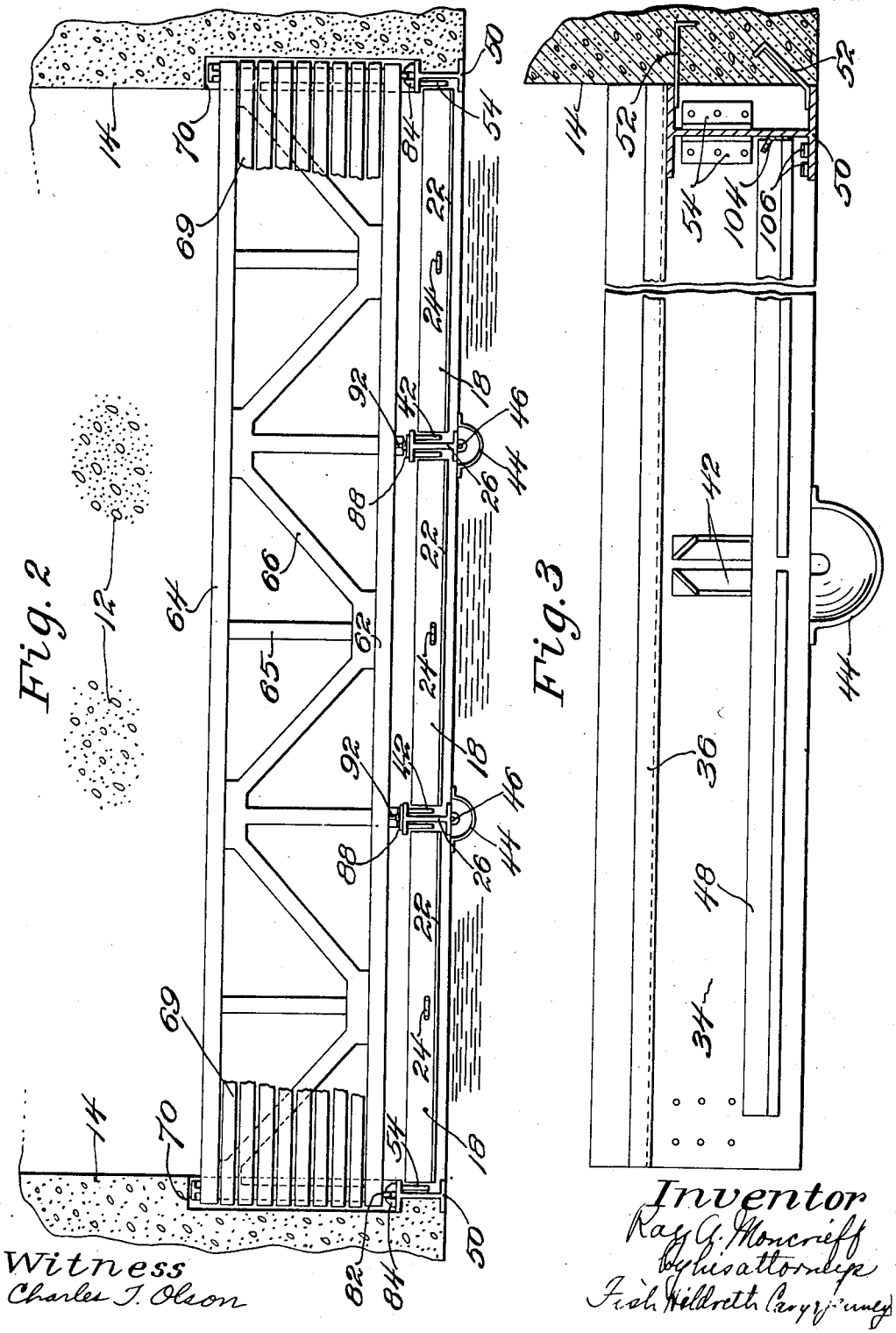

March 28, 1944.   R. A. MONCRIEFF   2,345,354
SHIP BUILDING BASIN
Filed Oct. 24, 1942   4 Sheets-Sheet 3

Inventor
Ray A. Moncrieff
by his attorneys
Fish, Hildreth, Cary & Jenney

Witness
Charles T. Olson

March 28, 1944.  R. A. MONCRIEFF  2,345,354
SHIP BUILDING BASIN
Filed Oct. 24, 1942  4 Sheets-Sheet 4
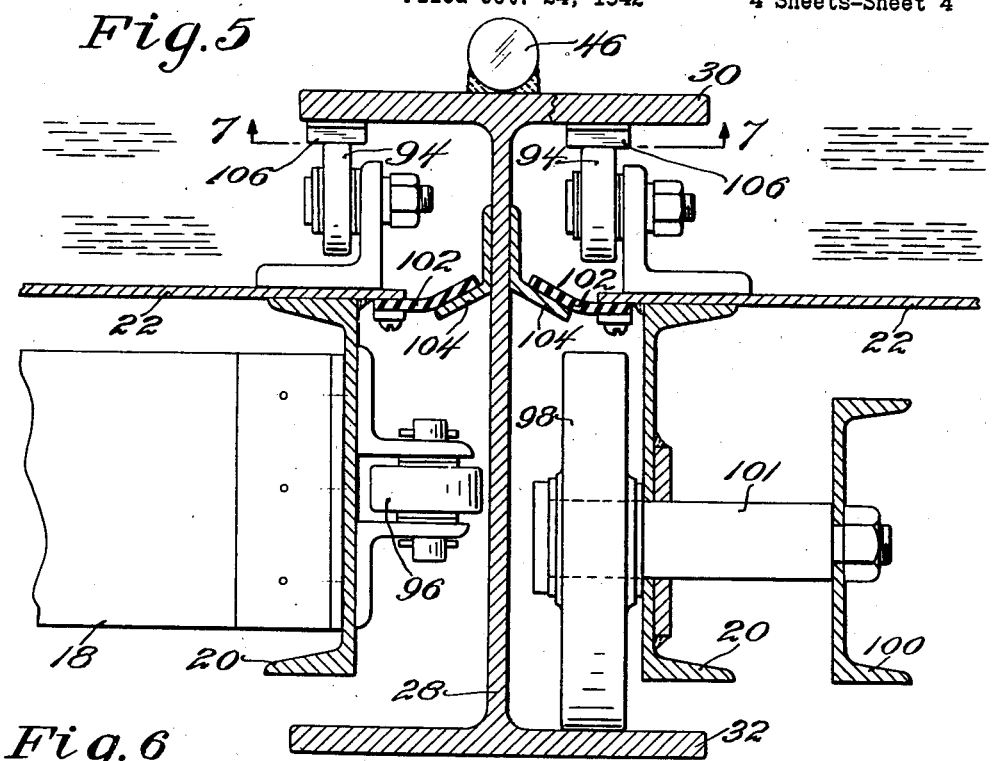
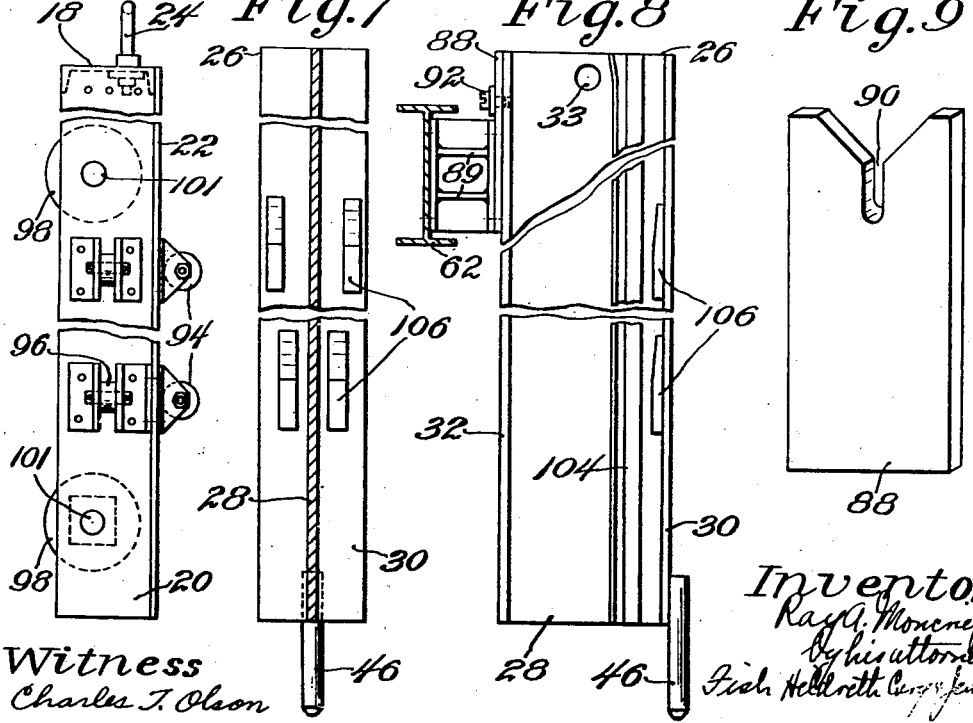
Witness
Charles T. Olson
Inventor
Ray A. Moncrieff
by his attorneys
Fish Hildreth Cary & Jenney Patented Mar. 28, 1944

2,345,354

UNITED STATES PATENT OFFICE 2,345,354

SHIPBUILDING BASIN

Ray A. Moncrieff, Newton Center, Mass., assignor to Charles T. Main, Inc., Boston, Mass., a corporation of Massachusetts Application October 24, 1942, Serial No. 463,170

7 Claims. (Cl. 61—64)

The present invention relates to shipbuilding basins, dry docks, and the like, and more particularly to the gate or other means by which the mouth of the basin is closed to prevent the ingress of water and permit the basin to be pumped dry, so as to facilitate the building and repair of vessels.

The usual shipbuilding basin or dry dock is located at the edge of a harbor or other body of water, the basin having a permanent floor, side walls and inner end wall. The level of the floor lies below the water level in the adjacent harbor a depth such that at high tide the desired draft of vessel may be accommodated, while the walls are sufficiently high to exclude the harbor waters at the highest tide.

In a basin of any size, the problem is to provide a dam or barrier for the outer end which will be sufficiently strong to resist the tremendous inward pressure of the water when the basin is emptied, yet will not be cumbersome so as to render difficult the opening and closing of the dock when the vessel is to be floated into or out of the basin. It is likewise desirable that such a closure be so constructed and arranged that leakage of water into the basin will be as small as possible.

For small basins it is feasible to employ swinging gates similar to those of a canal lock, but such type of closure requires relatively powerful and expensive operating mechanism which lies idle a great part of the time, especially in the case of a basin employed for the construction of ships. For the larger docks and basins, floating caissons have been employed, but these are large and unwieldy and hence are difficult to maneuver into and out of position.

It is therefore an object of the present invention to provide a shipbuilding basin wherein the closure for the outer end possesses great strength and affords a tight barrier, yet permits the basin to be opened and closed readily when a vessel is to enter or leave.

It is also an object of the invention to provide a basin gate which is relatively simple and inexpensive in construction, and which requires no special operating mechanism or equipment for opening and closing the basin.

With these objects in view, the present invention contemplates the provision of a gate for the mouth of a dry dock or ship basin, which is made up of separate elements adapted to be assembled in place across the basin mouth, these elements being removable by the yard crane or other lifting means normally present at the basin to provide unobstructed passage to and from the basin. More specifically, the gate comprises a number of separate gate sections which are adapted when placed side by side to extend across the mouth of the basin from one wall to the other. Through the use of vertical stanchions disposed between gate sections and supported by a truss or bridge spanning the basin walls adjacent the mouth, the gate sections are given support against the inward pressure of the water. Through such arrangement, relatively wide basins may be closed without rendering any one of the elements too heavy for handling by the cranes normally found in a basin of that size.

In the drawings illustrating the invention, Fig. 1 is a view in front elevation of a gate in place at the mouth of a shipbuilding basin, only so much of the basin being shown in this and the other views as is necessary to a full understanding of the invention; Fig. 2 is a top plan view of the basin gate, showing, however, only the bottom truss of the bridge, along with the individual gates and stanchions; Fig. 3 is a detail plan view of the gate sill, broken to permit the showing of both ends thereof, and with an end stanchion shown in section; Fig. 4 is a view of the basin gate in right side elevation, portions of the dock wall being broken away to permit showing the sill, end stanchion, and the mounting of the bridge on the dock wall; Fig. 5 is a detail sectional plan view showing an intermediate stanchion and adjacent portions of the gates supported thereby; Fig. 6 is a broken left side elevation of one of the individual gates showing certain of the supporting and guiding rolls; Fig. 7 is a view in broken rear elevation of an intermediate stanchion illustrating the positioning of the wedges on the front flanges thereof; Fig. 8 is a view in broken side elevation of an intermediate stanchion and its top end connection to the bridge, and Fig. 9 is a view in front elevation of a bearing plate of the stanchion top and connection.

To illustrate the construction and arrangement of the gate of the invention, a portion of the mouth or outer end of a shipbuilding basin of typical construction is shown in Figs. 1, 2 and 4. The basin comprises a floor 12, side walls 14, and an inner end, not shown. The mouth of the basin faces a harbor or other body of water, the height of the basin walls and gate being sufficient to exclude the water at the highest levels or tides. While the basin has been shown as constructed of concrete, and certain details of the gate are specially adapted for use with this type of material, the basin may be made of other materials as conditions permit or require.

The present invention is concerned with a gate that may be entirely removed by lifting from position across the basin mouth when the basin is to be opened. In order that the gate may be readily removed and replaced by lifting apparatus normally present in a shipbuilding basin, and still provide a gate of sufficient strength to resist water pressure which may total in the hundreds of tons, a number of separate gate sections 18 are employed to make up a barrier extending the full width of the basin. While the basin of the embodiment is shown as making use of three gate sections to span the mouth, other basins might employ a larger or a smaller number of sections, depending on the width and depth of the basin mouth, and the permissible size and weight of the units.

These individual gates or sections comprise a framework of heavy channel members 20 with a skin or covering of metal sheets 22 secured to the outer face of the structural members. A lifting eye 24 at the top permits each section to be lifted bodily by the dock yard crane.

Intermediate the gate sections are vertical stanchions 26 which not only provide support for the sections, but also are arranged to cooperate with the gate sections in providing a seal against water leakage through the spaces between sections. These intermediate stanchions are of I section having a central web 28, and front and rear flanges 30 and 32, respectively. At the top of each intermediate stanchion a hole 33 permits connection of a hook or shackle for lifting the stanchion.

To resist the tremendous pressure of the water when the basin is emptied, it is necessary that the stanchions, and particularly their lower ends, be given unyielding support against inward displacement. This is accomplished by the use of a stepped sill in the floor of the basin (see Fig. 4), the sill comprising a horizontal member 34, on which the stanchion ends rest, and a vertical member 36 against which the rear flanges of the stanchions bear. This sill is embedded in and forms a permanent part of the basin, the obliquely bent channels 38 and 40 serving to lock the sill to the basin floor.

Proper positioning of the stanchions at their stations along the sill is insured by flared flanges 42 which engage the web 28 of the I section. As a further aid in lowering the stanchion into position, especially when the water level is high, the sill is provided with conical sockets 44 at the stanchion stations, while the stanchions are equipped with guiding rods 46 secured to their front flanges 30. Providing that the stanchions are lowered in approximately the correct locations, the ends of the guide rods enter the mouth of the sockets 44 so that on further lowering, the stanchions become centered automatically and the web portion drops into place between the sill guide flanges 42. As a result, the services of a diver are generally unnecessary in setting these inermediate stanchions in position.

The seepage of water between the sill and the bottom edges of the gate sections is minimized through the use of a gasket or sealing strip 48 secured along its forward edge to the horizontal member 34 of the sill. This strip, for example a length of heavy rubber belting, carries the weight of the gates thereon, so that a tight joint is made as soon as the gate sections are lowered into place.

At each end of the basin gate, where the gate sections meet the walls, permanent stanchions 50 are provided, these like the sill being partially embedded in the cement structure of the basin. As shown in Fig. 3, these end stanchions are of I section, with supplementary members 52 embedded in the cement to lock the stanchions in place. The stanchions have their lower ends secured to the sill by flanges 54, principally to insure accurate positioning of the parts during construction of the basin.

The upper ends of the intermediate stanchions are supported by a bridge 60 which spans the mouth of the basin over the sill. Since the bridge is required for the most part to withstand forces directed inwardly of the basin, the bottom truss (shown in Fig. 2) is designed to be the major structural member of the bridge. This truss is formed by front and rear I-beams 62 and 64, cross members 65 and diagonals 66. A pin 67 between cross members 68 on the top of the bridge permits the bridge to be lifted at a point over its center of gravity. Flooring 69 laid over the bottom truss provides a convenient cross walk at the basin mouth.

The bridge is mounted on the walls of the basin in recesses 70, the rear walls of which are provided with bearing plates 72 so that the thrust of the bridge may be directly resisted by the body of the walls. Spacing members 74 carry the thrust of the I-beams and cross members to these bearing plates. The weight of the bridge rests on bearing plates 76, secured to the floor of the recess, the front plates including a cone-pointed centering pin 80 which projects into a hole in the bottom flange of the beam 62. Pins 82 projecting hroizontally from the front I-beam at its ends are guided by converging flange irons 84 on the rear flanges of the end stanchions as a further aid in guiding the bridge into proper position.

At the stations for the intermediate stanchions, the bridge is provided with bearing plates 88 against which the rear flange of the stanchions bear, the bearing plates being supported forwardly of the web of the I-beam by spacing members 89. The plates are provided with a vertical slot 90, having a wide-mouthed opening at the top to receive the shank of the stud 92 in each stanchion, the studs being tightened after the stanchions have been lowered into place to secure the upper ends thereof to the plates 88.

In order that the gate sections may be raised and lowered without binding against the stanchions, the sections are provided with front, side edge, and rear guide rolls, 94, 96 and 98 respectively. Since the rolls 98 engaging the rear flange of the stanchions are required to support the gate sections against the entire pressure of the water, once the gates have been put in place and the basin pumped out, these rolls are preferably more numerous and likewise of heavier construction than the other rolls. Supplementary vertical channels 100 in the sides of the gate sections provide support for the inner ends of the stub shafts 101 for these rolls.

Effective sealing to prevent water leakage between the stanchions and the gate sections is provided by the use of strips 102 of rubber belting or the like secured to the gate sections along their forward vertical edges. When the gate sections are in place, these strips bear against oblique flanges 104 secured to the webs of the stanchions, the intermediate stanchions having flanges on both sides of the web while the end stanchions require only a single flange. By this arrangement the water pressure itself forces the rubber strip against its supporting flange, automatically insuring a tight seal.

To insure proper positioning of the gate sections, and more particularly the sealing strips, relative to their cooperating flanges, the stanchions are provided with wedge blocks 106 which cause the gate sections, on reaching fully lowered position, to assume their rearmost position so that the rubber strips bear against the flanges 104. These wedge blocks are placed on the inside face of the front flange 30 of the stanchions in out-of-line position, the lower blocks lying close to the web and the upper blocks adjacent the edges of the flange. The front guide rolls on the gate sections are similarly staggered, so that the lower rolls on the gate section pass by without engaging the upper blocks as the gate is lowered into place. Thus substantial clearance may be provided between gate sections and stanchions throughout practically the entire distance up to the point when the gate reaches fully lowered position, at which time the wedge blocks each engage their respective front guide roll on the gate sections to set the section back uniformly and complete the rubber strip seal.

By the above described arrangement of gate sections, stanchions, and bridge, a basin gate is provided which affords a tight barrier of great strength, yet may be easily removed and replaced when a vessel is to enter or leave the basin. To open the gate, the basin is first allowed to fill with water, after which the gate sections are lifted out of place, the stanchion-securing studs 92 loosened and the stanchions raised, and finally the bridge itself lifted and swung or carried to one side, leaving a passage to the basin that is free and unobstructed for substantially the full width of the basin. Replacement of the gate consists in the reverse order of operations, the bridge, stanchions, and gate sections being brought up by the yard crane and lowered into place. Through the provision of the guiding devices described, no under water work is necessary at any time in replacing the gate elements.

While certain aspects of the invention have been illustrated and described in considerable detail, the invention is not to be considered as limited to these particular details of construction, but contemplates that modifications may be made to suit particular conditions and requirements.

Having thus described the invention, what I claim is:

1. In a shipbuilding basin, a gate for the mouth thereof comprising a plurality of gate sections adapted to be positioned across the mouth of the basin, and supporting means therefor including vertical stanchions intermediate the gate sections and a truss bridging the mouth of the basin and supporting the upper ends of the stanchions, the gate sections, stanchions and truss being removable to open the basin.

2. In a shipbuilding basin, a gate for the mouth thereof comprising a plurality of separate gate sections each substantially the depth of the basin and adapted when placed side by side to extend across the mouth of the basin, a truss bridging the basin at the mouth, and a plurality of vertical stanchions supported at their top by the truss and having their bottom ends secured against movement along the basin floor, said stanchions being disposed between and providing support for the gate sections, the gate sections, stanchions and truss each being bodily removable to open the basin.

3. In a shipbuilding basin, a gate for the mouth thereof comprising a plurality of separate gate sections adapted to be disposed in side-by-side relation across the basin mouth, vertical stanchions between gate sections for supporting the same, and a removable truss bridging the basin at the mouth end and supported against displacement inwardly of the basin, the stanchions having their upper ends detachably secured to the truss and their lower ends positioned at the sill of the basin against displacement inwardly of the basin, and cooperating sealing members on stanchions and gate sections to minimize leakage through the gate.

4. In a shipbuilding basin, a gate for the mouth thereof comprising a removable truss carried by the side walls of the basin and bridging the mouth end thereof, vertical stanchions detachably supported at their upper ends by the truss and having their lower ends supported by the sill of the basin, separate gate sections adapted to be disposed between and supported by the stanchions, and resilient sealing means operative under the influence of fluid pressure thereon when the gate is assembled for preventing leakage between the sill and the gate sections and between the gate sections and th stanchions.

5. In a shipbuilding basin having a floor, side walls and an end wall, a gate for the mouth of the basin comprising a plurality of separate gate sections adapted to be disposed in side-by-side relation across the basin mouth, a step formed in the basin floor adjacent the mouth of the basin and constituting a sill for the bottom of the gates, a vertical stanchion fixed in each side wall of the basin in line with the sill, a truss bridging the mouth of the basin and demountably supported on the side walls thereof, and vertical stanchions having their lower ends removably socketed in the sill and their upper ends detachably connected to and supported by the truss, the gate sections being received between and supported by the stanchions.

6. In a shipbuilding basin having a floor, side walls and an end wall, a gate for the mouth of the basin comprising a truss carried by the side walls and bridging the mouth end of the basin, a sill comprising step and riser portions formed in the basin floor across the mouth thereof, vertical stanchions supported at their upper ends by the truss and having their lower ends supported by the sill, the sill and stanchions having cooperating guiding means for directing the stanchions into position on the sill as the stanchions are lowered, and separate gate sections adapted to be disposed between and supported by the stanchions to form a barrier across the mouth of the basin, the gates, stanchions and truss being bodily removable from the basin mouth to provide clear passage therethrough.

7. In a shipbuilding basin, a gate for the mouth of the basin comprising a removable truss carried by the side walls of the basin and bridging the mouth thereof, vertical stanchions supported at the top by the truss and having their lower ends secured against displacement inwardly of the basin floor, said stanchions having an I-shaped section comprising front and rear flanges and a connecting web, separate gate sections adapted to be disposed between the stanchions, said gate sections having guiding rolls for positioning the gates relative to and intermediate the stanchion flanges and webs, cooperating sealing means on the stanchions and gate sections, and wedging means on the stanchions adapted to be engaged by the guiding rolls as the gates approach fully lowered position to insure accurate final position of the gates with the sealing means in operative relation.

RAY A. MONCRIEFF.